Dec. 28, 1937. P. DRUMMOND 2,103,714
METAL TOP FOR DRY CELLS
Filed Nov. 30, 1932

INVENTOR
PRICE DRUMMOND
BY
ATTORNEY

Patented Dec. 28, 1937

2,103,714

UNITED STATES PATENT OFFICE 2,103,714

METAL TOP FOR DRY CELLS

Price Drummond, Rocky River, Ohio, assignor, by mesne assignments, to Union Carbide and Carbon Corporation, a corporation of New York Application November 30, 1932, Serial No. 645,007

4 Claims. (Cl. 136—133)

The invention pertains in general to mechanical closures for dry cells in contradistinction to thermoplastic closures, and more specifically to a combined metal top and inner electrode cap forming such a closure along with suitable insulation.

Heretofore, such closures comprised a metal top forming part of the outer electrode, a metal cap forming part of the inner electrode, and a dielectric mechanically closing the electrical gap between the electrodes. This invention is an improvement over such closures.

One of the objects of the invention is to provide such a closure having fewer parts adapted for machine assembly with fewer operations.

Other objects are to provide such a closure that is more rugged and simpler in structure, less liable to damage, lower in cost, better adapted to machine manufacture, more pleasing and distinctive in appearance, and provides better protection and more firm support for the inner electrode.

Figure 1:
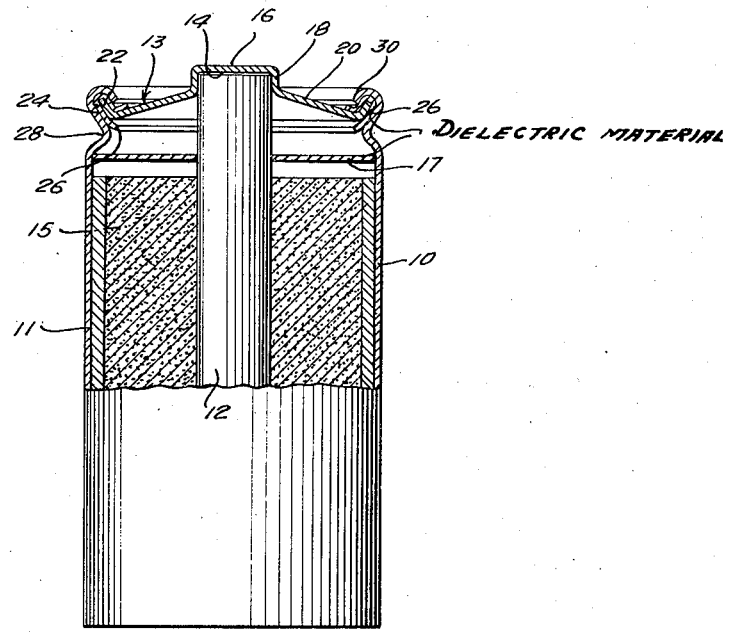
Figures 2, 3:
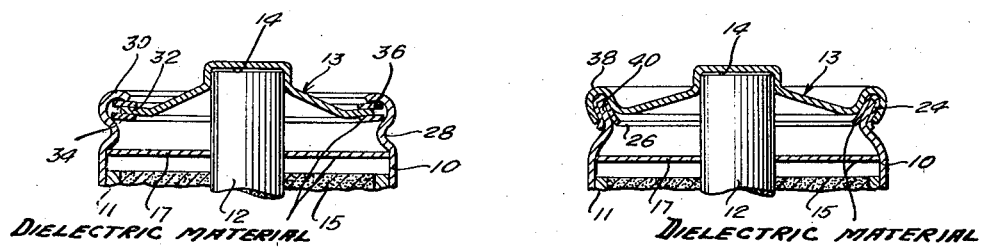

These and other objects and novel features will appear in the following description and the accompanying illustration, in which:

Figs. 1, 2 and 3 are enlarged sectional views each along a vertical plane of the upper end of a dry cell embodying one example of an application of my invention.

The dry cell shown in the drawing and to which my closures are applied is of conventional structure and comprises an outer electrode or zinc container 10, an inner electrode or carbon rod 12 and suitable electrolyte 11 and depolarizer 15. The cell may also comprise an electrolyte suppressor such as a dielectric washer 17 having the inner edge in contact with the inner electrode and the outer edge in contact with the outer electrode. Such a suppressor prevents electrolyte, which is usually gelatinized, from reaching the closure.

In general my closure comprises a suitably formed conductive top of metal in electrical contact with the inner electrode and mechanically secured to the outer electrode by an insulated joint of compression wherein the mechanically joined parts are electrically separated at the junction by a suitable dielectric. The metal top is preferably secured to the outer electrode within the periphery thereof, so that no part of the joint extends beyond the outer surface of the main part of the zinc can 10. This results in greater compactness and convenience in storage and use. The top is preferably provided with a suitable pocket to support the inner electrode; and either the outer margin of the top or the upper margin of the container may be provided with an annular recess in which the other margin is secured. The dielectric may be unitary, pliable, and conform to the shape of the joint, or it may be comparatively rigid and comprise a plurality of sections.

The conductive top is preferably of metal such as iron, steel, or brass, of a uniform thickness between 10 and 30 thousandths of an inch. The closure may be provided with an opening of suitable size to provide a vent for the escape of gas generated within the cell, but as the vent forms no part of the invention it is not shown in the drawing.

In general the form of the closure is circular and convex or conical with the convex side uppermost. More specifically the under side of the metal top is provided with a central pocket having a cylindrical side wall closely fitting the upper end of the cylindrical inner electrode. From the lower edge of the pocket the top is conical or inclined downward to the outer margin which may be flared upward, flat, or provided with an annular recess, according to the type of joint employed to secure it to the outer electrode.

In the three examples shown in the drawing the closure comprises a conductive metal top 13 having an inverted central pocket 14 with a substantially flat bottom 16 and a cylindrical side wall 18, a conical or downwardly sloping intermediate annular portion 20, and an annular outer margin 22.

In the example shown in Fig. 1 the outer margin 22 of top 13 is flared upward and mechanically secured in an annular upwardly flared, recess 24, open inwardly in the upper end of can 10 from which it is electrically separated by a dielectric 26 of pliable material such as paper, pulpboard, varnished cambric, or the like. The recess 24 is formed in the upper margin of can 10 by an inturned annular rib 28 below margin 22, and an inturned or overturned upper edge 30 of can 10 above margin 22.

The opening in recess 24 faces downward and inward at an angle, and the joint between can 10 and top 13 is one of compression formed by the pressure of the sides of recess 24 on margin 22 and its surrounding electrical insulation 26.

The top 13 protects electrode 12 from outside shocks, blows, or pressure, and also supports it both radially and axially. Cells provided with this improved closure are more rigid, less liable to damage, cheaper to manufacture, and more distinctive, neater, and better in appearance.

The example shown in Fig. 2 is similar to that shown in Fig. 1 with the exception that the outer margin of top 13 is flat or on a horizontal plane, and the electrical insulation comprises a comparatively rigid dielectric washer 34 between the under side of margin 32, and rib 28, and a similar washer or annular member 36 between the upper side of margin 32 and the overturned edge 30 of can 10. The annular insulating members or dielectric washers 34 and 36 may be of any suitable material such as fiber, pulpboard, or a molded resinous material.

The example shown in Fig. 3 is similar to that shown in Fig. 1 with the exception that annular recess 24 is formed in the outer margin 38 of top 13 and the upper margin 40 of can 10 is offset inward, flared upward, and mechanically secured in recess 24 but electrically separated therefrom by dielectric 26.

In all of the examples the central portion of top 13, forming the bottom of pocket 14, is somewhat above the upper edge or margin of can 10 so that when two or more cells are placed end to end with their tops facing upward, the bottom of one cell will make contact with the central portion 16 of top 13 of the cell below it and the cells will be electrically connected in series.

As long as the function is retained, various changes may be made in the form, shape, size, and relative arrangement of the component parts, and other similar and equivalent materials may be employed, without departing from the range of the invention or the scope of the claims.

I claim:—

1. In a dry cell; an inner electrode; an outer container electrode having an inwardly and downwardly open recess in the upper end thereof; a unitary conductive metal closure having a mid-portion permanently in electrical contact with an end of said inner electrode and having an upwardly turned flanged outer margin thereof secured in said recess but spaced from said container electrode, the said mid-portion of the closure being above the plane of the outer margin, and a di-electric member in the recess for insulating the said container electrode from said closure.

2. In a dry cell, the combination of a cylindrical zinc container having an inwardly and downwardly turned upper marginal flange portion providing an internal recess within and coextensive with the upper end of said container; a carbon electrode centrally disposed in said container and projecting above the plane of said recess; a unitary circular sheet metal closure constituting a combined cover for said container and a cap for the upper end of said carbon electrode, the cap portion of said closure being electrically in contact with said carbon electrode, and the outer margin of said closure extending into and being permanently secured within said recess between said flange portion and the main body of said container, to lock said closure in place and to resist any tendency of said carbon electrode or expansion within the cell to lift said closure off said container; and means in said recess for electrically insulating the said closure from said container.

3. In a dry cell, the combination of a container having an inwardly and downwardly turned upper marginal flange portion provided with an internal recess within and coextensive with the upper end of said container; an inner electrode centrally disposed in said container and projecting above the plane of said recess; a unitary sheet metal closure constituting a combined cover for said container and a cap for the upper end of said inner electrode, said metal closure having an upturned outer margin, and the cap portion of said closure being electrically in contact with said inner electrode and the outer margin of said closure extending into and being permanently secured within said recess between said flange portion and the main body of said container to lock said closure in place and to resist any tendency of said inner electrode or the expansion within the cell to lift said closure off said container; and means in said recess for electrically insulating the said closure from said container.

4. In a dry cell; an inner electrode; an outer container electrode having an inwardly extending annular rib adjacent its upper margin and having an inwardly and downwardly open recess disposed between the said rib and the said upper margin; a unitary metal closure having a mid-portion permanently in electrical contact with the upper end of said inner electrode and having an upwardly-turned flanged outer margin thereof secured in said recess but insulated from said container electrode and adapted to be supported upon a portion of the inner surface of the container electrode above the said rib, the said mid-portion of the closure being above the plane of the said outer margin, and a di-electric member in the recess for insulating the said container electrode from said closure.

PRICE DRUMMOND.